United States Patent [19]
Bennett et al.

[11] 3,821,373
[45] June 28, 1974

[54] ORGANOSILICON COMPOSITIONS IN METHODS OF TREATMENT INVOLVING INCREASING THE DOPAMINE CONTENT OF THE BRAIN

[75] Inventors: Donald R. Bennett; Robert R. Levier, both of Midland, Mich.

[73] Assignee: Dow Corning Corporation, Midland, Mich.

[22] Filed: May 14, 1973

[21] Appl. No.: 359,929

[52] U.S. Cl. .............................................. 424/184
[51] Int. Cl. ............................................. A61k 27/00
[58] Field of Search .................................... 424/184

[56] References Cited
UNITED STATES PATENTS
3,652,628  3/1972  Hyde et al................... 260/448.2 R Primary Examiner—Stanley J. Friedman
Attorney, Agent, or Firm—Norman E. Lewis

[57] ABSTRACT

The dopamine content of the brain tissue of an animal is increased by administering an effective amount of an organosilicon compound selected from the group consisting of 2,6-cis-diphenylhexamethylcyclotetrasiloxane, 2,6-trans-diphenylhexamethylcyclotetrasiloxane and mixtures thereof. Use of such compounds compensates for deficiency of dopamine in the brain tissue which is known to alleviate some of the symptoms caused by Parkinsonism, manganese poisoning and similar diseases.

10 Claims, No Drawings

ORGANOSILICON COMPOSITIONS IN METHODS OF TREATMENT INVOLVING INCREASING THE DOPAMINE CONTENT OF THE BRAIN

The present invention relates to a method of treatment whereby the amount of dopamine in the brain tissue of an animal can be increased. In one aspect, the invention relates to administering certain organosilicon compounds to an animal in amounts sufficient to increase the dopamine content of the brain tissue of the animal. One specific aspect of the invention relates to compensating for a dopamine deficiency in the brain tissues of animals.

BACKGROUND OF THE INVENTION

A dopamine deficiency has been demonstrated to occur in certain nuclei of the brain tissue in patients with Parkinson's disease. Increased levels of dopamine in brain tissue can result in overt central nervous system stimulation. Dopamine is 3,4-dihydroxyphenylethylamine of the structure

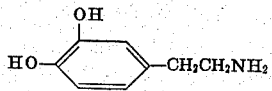

Deficiency of dopamine in the corpus striatum results in increased muscular tension and akinesia which is defined as the absence or disturbance of motion in a muscle. This is characterized by the rigidity of limbs and difficulty in walking, standing and sitting and the like as noted in the Parkinson syndrome.

Initially, dopamine itself was administered directly to the animal in an attempt to increase the dopamine content of the brain. However, a natural blood-brain barrier prevented absorption of dopamine in the brain tissue. It was then proposed that a metabolic precursor be administered, allowing the body to metabolize the compound after it had traversed the blood-brain barrier. Dopa or 3,4-dihydroxyphenylalanine, of the formula

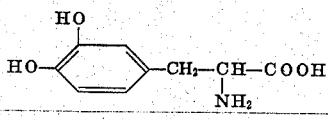

was a known precursor, being subject to decarboxylation. When dopa was employed to increase the dopamine content of the brain numerous side effects were encountered. Among the side effects were nausea and vomiting, as well as hypertension in some instances and hypotension in others. The overall results of the dopa treatment ranged from poor to excellent in alleviating muscular tension and akinesia. L-dopa has been separated from racemic dopa and is utilized for the treatment of muscular tension and akinesia but it too produces undesirable side effects because it must be administered in high dosage levels.

Thus, compounds for increasing the dopamine content of brain tissue are of great interest. Compounds which increase dopamine content and produce overt central nervous system stimulation without nausea would find widespread acceptance.

Therefore, it is an object of the invention to provide a method of increasing the dopamine content of animal brain tissue. A specific object of the invention is to provide a method of compensating for a dopamine deficiency in the brain tissue of animals. These and other objects of the invention will be apparent to one skilled in the art upon consideration of the following disclosure and appended claims.

DETAILED DESCRIPTION OF THE INVENTION

In accordance with the present invention, there is provided a method of increasing the dopamine content of the brain tissue of animals which comprises administering to the animal an effective amount of an organosilicon compound selected from the group consisting of 2,6-transdiphenylhexamethylcyclotetrasiloxane; 2,6-cis-diphenylhexamethylcyclotetrasiloxane and mixtures thereof.

The cyclotetrasiloxanes utilized in the practice of the invention are of the structural formula:

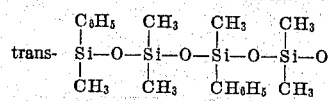

and

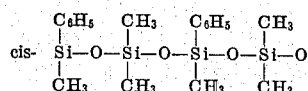

These cyclotetrasiloxanes can be prepared by reaction of the appropriate disiloxanol with a chloroterminated disiloxane in a solvent in the presence of an acid acceptor. Suitable acid acceptors include triethylamine, pyridine and alpha-picoline. If desired, the reaction product, a mixture, containing both cis- and trans-isomers, can be subjected to distillation and fractional crystallization to obtain substantially pure 2,6-cis or 2,6-trans product. A detailed description of the preparation and purification of these siloxanes can be found in U.S. Pat. No. 3,652,628, which also discloses the androgen depressant effects of such organosilicon compounds.

The organosilicon compounds can be administered in any pharmacologically acceptable manner. The modes of administration include both oral and intravenous. It is preferred that the compound be administered in or in combination with a pharmaceutically acceptable carrier or diluent. Suitable carriers include the fat-soluble materials commonly employed in numerous pharmaceutical preparations. When administered orally, the preferred carriers for the organosilicon compounds include sesame oil, corn oil, mineral oil and soya oil.

For intravenous administration, the preferred carriers are the pharmaceutically acceptable fat emulsions. The fat emulsions contain a vegtable oil in water with one or two emulsifiers. Several different phosphatides are used as emulsifiers. Commercially available fat emulsions, such as INFONUTROL, INTRALIPID, hopofundin, and hipiphysan, are described in detail in Clinical Nutrition, August, 1967, at Pages A-71 to A-73.

The particular cyclotetrasiloxanes or mixtures thereof are administered in an amount effective to increase the dopamine content of the brain tissue of the animal. The precise dosage will depend upon the particular species, the specific mode of administration and carrier used and amount of increase one wishes to achieve. Dependent also on these factors, the siloxane can be administered as a single dosage or as a daily dosage over a period of time, for example, from about 7 to 30 days or more. Generally, a dosage in the range of 1 to 100 mg. per kilogram of body weight on a daily basis is effective to bring about the desired increase over a period of time, such as 7 days.

The following example is illustrative and should not be construed as limiting the invention which is delineated in the claims.

EXAMPLE

The effects of substantially pure 2,6-cis-diphenylhexamethylcyclotetrasiloxane and substantially pure 2,6-trans-diphenylhexamethylcyclotetrasiloxane administered to mature male rats on accessory tissue weights and whole brain dopamine and norepinephrine are summarized in the table below. The noted amounts of the cyclotetrasiloxane were administered orally in a forced daily dosage contained in one ml. of sesame oil. The oral administration was continued for seven consecutive days with the animals being sacrificed on day eight. Isolation and determination of the catecholamines was carried out according to the methods of Anton and Sayer as described in J. Pharmacol. Exp. Ther.; Vol. 138, pp. 360–375, 1962 and Ibid., Vol. 145, pp. 326–336, 1964.

In the table below, $n$ designates the number of animals in the group tested, accessory tissue (seminal vesicle and ventral prostrate) weight is given in milligrams per 100 grams of body weight and the catecholamine concentration is given in micrograms per gram of brain weight. The brain tissue of the control group and the treated group for each experiment were analyzed within a short time of each other but analysis of the two (2,6-cis/control and 2,6-trans/control) experiments were run at different points in time. This difference in time resulted in a difference in the analyzable dopamine content of the brain tissue of two control groups.

TABLE

| GROUP | n | DAILY DOSAGE | SEMINAL VESICLE (mg/100 grams) |
|---|---|---|---|
| CONTROL | 7 | — | 96.3 ± 5.5 |
| 2,6 - Cis Isomer | 8 | 33 mg/kg | 49.4 ± 1.7* |
| CONTROL | 6 | — | 88.9 ± 2.3 |
| 2,6 - Trans-Isomer | 6 | 100 mg/kg | 90.4 ± 4.4 |

*$P<0.05$ — in determination of statistical significance

TABLE

| GROUP | VENTRAL PROSTATE (mg/100 grams) | DOPAMINE ($\mu$gm/gm) | NOREPINEPHRINE ($\mu$gm/gm) |
|---|---|---|---|
| CONTROL | 74.4 ± 9.3 | 1.19 ± 0.13 | 0.12 ± 0.01 |
| 2,6 - Cis Isomer | 31.3 ± 2.1* | 1.82 ± 0.23* | 0.12 ± 0.02 |
| CONTROL | 98.5 ± 4.9 | 2.25 ± 0.16 | 0.12 ± 0.01 |
| 2,6 - Trans Isomer | 109.3 ± 10.9 | 4.17 ± 0.46* | 0.17 ± 0.01* |

*$P<0.05$ — in determination of statistical significance

These results demonstrate that both the 2,6-cis and the 2,6-trans isomers are effective in increasing the dopamine content of the brain tissue of animals. The cis-isomer gave a 53 percent increase in dopamine content at the lower level of dosage which was also sufficient to decrease the size of the sex accessory organs. The trans-isomer at the higher dosage gave an 85 percent increase in dopamine without altering accessory organ weights. Because of the activity of 2,6-trans with respect to dopamine levels in the brain and lack of effect on the sex accessory organs (as compared to 2,6-cis), the transisomer is preferred for use in the method of the invention. It is to be noted that the level of norepinephrine, a catecholamine resulting from the metabolism of dopamine, was also increased by administration of the trans-cyclotetrasiloxane.

Reasonable modification and variation, such as administration in combination with L-dopa or other pharmaceutically active compounds, is within the scope of the invention which is directed to a method of increasing the dopamine content of the brain tissue of animals.

That which is claimed is:

1. A method of increasing the dopamine content of the brain tissue of an animal comprising administering to said animal an effective amount of an organosilicon compound selected from the group consisting of 2,6-trans-diphenylhexamethylcyclotetrasiloxane, 2,6-cis-diphenylhexamethylcyclotetrasiloxane and mixtures thereof.

2. A method in accordance with claim 1 wherein the organosilicon compound is contained in a pharmaceutically acceptable carrier therefor.

3. A method in accordance with claim 2 wherein the organosilicon compound is substantially pure 2,6-transdiphenylhexamethylcyclotetrasiloxane.

4. A method in accordance with claim 2 wherein the organosilicon compound is substantially pure 2,6-cis-diphenylhexamethylcyclotetrasiloxane.

5. A method in accordance with claim 2 wherein a mixture of said organosilicon compounds is administered.

6. A method in accordance with claim 2 wherein the organosilicon compound is administered orally and the pharmaceutically acceptable carrier is selected from the group consisting of sesame oil, corn oil, mineral oil and soya oil.

7. A method in accordance with claim 2 wherein the compound is administered in an amount in the range of 1 to 100 mg./kilogram of animal body weight per day.

8. A method in accordance with claim 2 wherein the organosilicon compound is administered intravenously and the carrier is a pharmaceutically acceptable fat emulsion.

9. A method in accordance with claim 8 wherein the organosilicon compound is substantially pure 2,6-transdiphenylhexamethylcyclotetrasiloxane.

10. A method in accordance with claim 8 wherein the organosilicon compound is substantially pure 2,6-cis-diphenylhexamethylcyclotetrasiloxane.

* * * * *